US009491619B2

(12) United States Patent
Das et al.

(10) Patent No.: US 9,491,619 B2
(45) Date of Patent: Nov. 8, 2016

(54) METHOD AND SYSTEM FOR PREAUTHENTICATING A MOBILE NODE

(75) Inventors: Amitabha Das, Bangalore (IN); Sanjoy Paul, Bangalore (IN)

(73) Assignee: Infosys Technologies Ltd., Bangalore, Karnataka (IN)

( * ) Notice: Subject to any disclaimer, the term of this patent is extended or adjusted under 35 U.S.C. 154(b) by 0 days.

(21) Appl. No.: 13/024,160

(22) Filed: Feb. 9, 2011

(65) Prior Publication Data

US 2012/0077461 A1 Mar. 29, 2012

(30) Foreign Application Priority Data

Sep. 27, 2010 (IN) .............................. 2825/CHE/2010

(51) Int. Cl.
*H04M 1/66* (2006.01)
*H04W 12/06* (2009.01)
*H04L 29/06* (2006.01)
*H04W 36/14* (2009.01)

(52) U.S. Cl.
CPC .......... *H04W 12/06* (2013.01); *H04L 63/0884* (2013.01); *H04L 63/0892* (2013.01); *H04W 36/14* (2013.01)

(58) Field of Classification Search
CPC ..................................................... H04W 12/06
USPC .................................................. 455/450–460
See application file for complete search history.

(56) References Cited

U.S. PATENT DOCUMENTS

| 2004/0143735 | A1* | 7/2004 | Ferguson ....................... 713/153 |
| 2008/0095114 | A1* | 4/2008 | Dutta et al. ................... 370/331 |
| 2009/0028101 | A1* | 1/2009 | Kakumaru ..................... 370/329 |
| 2009/0028120 | A1* | 1/2009 | Lee .............................. 370/338 |
| 2009/0088159 | A1* | 4/2009 | Wu et al. ...................... 455/436 |
| 2009/0116447 | A1* | 5/2009 | Balasubramanian et al. ............................. 370/331 |
| 2009/0285176 | A1* | 11/2009 | Zheng et al. ................. 370/331 |
| 2010/0325714 | A1* | 12/2010 | Iyer et al. ......................... 726/8 |
| 2011/0078442 | A1* | 3/2011 | Gong et al. ................... 713/168 |

FOREIGN PATENT DOCUMENTS

WO  WO2010000185  *  1/2010

OTHER PUBLICATIONS

Shidhani, A.., et al., "Secured fast link-layer handover protocols for 3G-WLAN Interworking architecture", Department of Electrical and Computer Engineering, Jun. 2007, The University of British Columbia, pp. 1-7.
Choi, H., et al., "Seamless Handoff Scheme Based on Pre-registration and Pre-authentication for UMTS-WLAN Interworking", Wireless Personal Communications, 2007, vol. 41, pp. 345-364.

(Continued)

*Primary Examiner* — Keith Fang
(74) *Attorney, Agent, or Firm* — LeClairRyan, a Professional Corporation

(57) ABSTRACT

A method of preauthenticating a mobile node in advance of a switch from a current point of attachment (CPoA) to a next point of attachment (NPoA) is disclosed. One or more preauthentication requests are received at the CPoA. The one or more preauthentication requests include a proxy assignment from the mobile node. Each of the one or more preauthentication requests corresponds to one of one or more possible points of attachment (PPoAs). Using the CPoA, the mobile node is preauthenticated with the one or more PPoAs using a transitivity of trust between the mobile node, the CPoA, and one or more authentication servers.

45 Claims, 8 Drawing Sheets

(56) References Cited

OTHER PUBLICATIONS

"Universal Mobile Telecommunications Systems (UMTS); 3GPP system to Wireless Local Area Network (WLAN) Interworking; System description", Technical Specification, Dec. 2004, 3GPP TS 23.234 version 6.3.0, Release 6.

Durgin N., et al., "A compositional logic for protocol correctness", Computer Science Dept., Stanford University, last accessed May 2016, pp. 1-15.

Hlousley, R., et al., "Guidance for Authentication, Authorization, and Accounting (AAA) Key Management", Network Working Group, Jul. 2007, pp. 1-23.

IEEE, "IEEE 802.11i-2004", Wikipedia, last accessed May 2016, pp. 1-4.

Taniuchi, K., et al., "IEEE 802.201: Media Independent Handover: Features, Applicability, and Realization", IEEE Communications Magazine, Jan. 2009, pp. 1-9.

Izquierdo, A., et al., "Using the EAP Framework for Fast Media Independent Handover Authentication", National Institute of Standards and Technology, 2008, pp. 1-8.

Mishra, A, et al., "Pro-active Key Distribution using Neighbor Graphs", Department of Computer Science, University of Maryland, Mar. 2012, pp. 1-7.

Narayanan V., et al., "EAP Extensions for EAP Re-authentication Protocol (ERP) draft-ieff-hokey-erx-14", Network Working Group, Mar. 29, 2008, pp. 1-44.

Ohba Y., "EAP Pre-authentication Problem Statement draft-ietf-hokey-preauth-ps-03", Network Working Group, Jun. 4, 2008, pp. 1-19.

International Telecommunications Union, "Series G: Transmission Systems and Media, Digital Systems and Networks" ITU-T, Telecommunication Standardization Sector of ITU, 2003, pp. 1-20.

\* cited by examiner

METHOD AND SYSTEM FOR PREAUTHENTICATING A MOBILE NODE

This application claims the benefit of Indian Patent Application No. 2825/CHE/2010, filed Sep. 27, 2010, which is hereby incorporated by reference in its entirety.

FIELD

This technology relates to mobile nodes, and more specifically, this technology relates to a method for preauthenticating a mobile node prior to a handover of the mobile node between wireless access networks.

BACKGROUND

When a mobile node, such as a mobile phone, personal digital assistant (PDA), smartphone, wireless computing device, or mobile gateway roams from one place to another, it often switches its point of attachment from one base station (wireless access point) to another. This process of switching from one point of attachment to another is called a "handover." Handover requires extensive background coordination among various network elements which support communications between the mobile node and the plurality of access points. Such background coordination includes extra signaling messages which involve some delay. A major portion of the time for handover related signaling involves transferring and verifying the mobile node's security related credentials from one base station to another. If the handover occurs between two base stations (points of attachment) that support the same type of network communication protocol, then such handover is called a "horizontal handover", and the existing methods for such handover are quite efficient.

However, different types of communication protocols are continually emerging and coexist. Non-limiting examples of such communication protocols include Global System for Mobile (GSM), General Packet Radio Service (GPRS), Enhanced Data Rates for GSM (EDGE), Universal Mobile Telecommunications System (UMTS), Digital Enhanced Cordless Telecommunications (DECT), Code Division Multiple Access (CDMA), Time Division Multiple Access (TDMA), Frequency Division Multiple Access (FDMA), Evolution Data Optimized (EVDO), 3G, 4G, Long Term Evolution (LTE), Worldwide Interoperability for Microwave Access (WiMAX), IEEE 802.11x (WiFi), Bluetooth®, etc. In light of the many available communication protocols, mobile nodes frequently come fitted with multiple radio transceivers. A natural requirement arising from such flexible hardware is that mobile nodes should be able to roam among diverse types of access networks seamlessly just like they can now between base stations of the same technology. The corresponding handover between different types of access networks is called "vertical handover".

This notion of "seamless mobility", or roaming ability, among different types of access networks currently faces a serious challenge due to high delays incurred during vertical handover related signaling. A significant part of this signaling latency occurs during the process of authentication. Authentication refers to the process of verification of the mobile node's identity as it moves from one network to another.

Presently, there are three known ways to carry out authentication during a vertical handover process: 1) Full Authentication; 2) Reauthentication, and 3) Preauthentication. Full authentication between a mobile node and a point of attachment is carried out whenever the mobile node first sets up a connection through an access network. Three entities are involved in the authentication process, the mobile node, the point-of-attachment providing network access, and a back end authentication server.

Full Authentication takes a relatively long time to complete, and therefore, if it is used during a handover, the latency becomes too high to sustain an ongoing connection, and the connection is most likely to be dropped, especially in a scenario where the connection was supporting a voice communication where delays may become noticeable and can be unacceptable.

Alternatively, reauthentication may be carried out when the current and next networks have a prior agreement to share a master key. Unfortunately, reauthentication is not applicable in general across network administrative boundaries.

Currently, preauthentication is full authentication with a next point of attachment (NPoA) carried out by a mobile node while it is still connected with the current point of attachment (CPoA). In this case, a connection is first established between the CPoA and the NPoA, and the mobile node communicates all authentication related messages to the NPoA, through the CPoA. Unfortunately, since the authentication related messages, as part of current preauthentication processes, pass through an extra hop (between the CPoA and the NPoA in addition to the hop from the mobile node to the CPoA), the overall time taken to complete the process is longer than a direct full authentication. In an effort to mitigate the effect of such delays, some devices attempt to start the preauthentication process far in advance of the actual handover.

For media independent handover, the Extensible Authentication Protocol (EAP) has been adopted as the general authentication protocol as it offers the generality and required security guarantees for such inter-network transfers. A number of specific methods are supported by the EAP framework. Out of these, the EAP-TLS (Extensible Authentication Protocol-Transport Level Security) method offers the strongest authentication. Depending on the processing platform and algorithms used, in order to achieve an acceptable latency of 50 ms as per ITU recommendations, an EAP-TLS based preauthentication process must be started up to 31 seconds in advance of an imminent handover. Unfortunately, this is not feasible for most practical scenarios, especially where a mobile node user is moving at a high speed, and possible next points of access may not even be within range until shortly before the handover is needed. Furthermore, the amount of processing necessary at the mobile node for preauthentication can lead to dropping of packets even when it is connected to the previous base station.

SUMMARY

A method of preauthenticating a mobile node in advance of a switch from a current point of attachment (CPoA) to a next point of attachment (NPoA) is disclosed. One or more preauthentication requests are received at the CPoA. The one or more preauthentication requests include a proxy assignment from the mobile node. Each of the one or more preauthentication requests corresponds to one of one or more possible points of attachment (PPoAs). Using the CPoA, the mobile node is preauthenticated with the one or more PPoAs using a transitivity of trust between the mobile node, the CPoA, and one or more authentication servers.

A communication system is also disclosed. The communication system has one or more authentication servers, one or more possible points of attachment (PPoAs), and a current point of attachment (CPoA). The CPoA is configured to: receive one or more preauthentication requests comprising a proxy assignment from a mobile node, each of the one or more preauthentication requests corresponding to one of the one or more PPoAs; and forward each of the one or more preauthentication requests comprising the proxy assignment to a corresponding authentication server of the one or more authentication servers via a corresponding PPoA of the one or more PPoAs to preauthenticate the mobile node with the one or more PPoAs using a transitivity of trust between the mobile node, the CPoA, and the one or more authentication servers.

A mobile node is also disclosed. The mobile node has at least one transceiver and a computing device coupled to the at least one transceiver. The computing device is configured to: determine that a handover from a current point of attachment (CPoA) to one or more possible points of attachment (PPoAs) is possible; and transmit one or more preauthentication requests corresponding to the one or more PPoAs to the CPoA, the one or more preauthentication requests comprising a proxy assignment.

A computer program product for preauthenticating a mobile node in advance of a switch from a current point of attachment (CPoA) to a next point of attachment (NPoA) is also disclosed. The computer program product comprises a tangible storage medium readable by a processor and storing instructions for execution by the processor. The instructions include instructions for receiving one or more preauthentication requests at the CPoA, the one or more preauthentication requests comprising a proxy assignment from the mobile node. Each of the one or more preauthentication requests corresponds to one of one or more possible points of attachment (PPoAs). The instructions also include instructions for using the CPoA to preauthenticate the mobile node with the one or more PPoAs using a transitivity of trust between the mobile node, the CPoA, and one or more authentication servers.

The low processing and signaling delay associated with the disclosed fast preauthentication method and system reduces the necessary lead time making it feasible to start preauthenticating in advance of an actual handover for a mobile node roaming between two networks. This has the benefit of significantly reducing the latency associated with vertical handover and substantially reducing the computational burden on the mobile node during a handover. This frees up computing resources of the mobile node to handle ongoing communication sessions more efficiently. With this invention, a major hurdle in the implementation of seamless mobility between different types of networks is removed.

Figure 1:
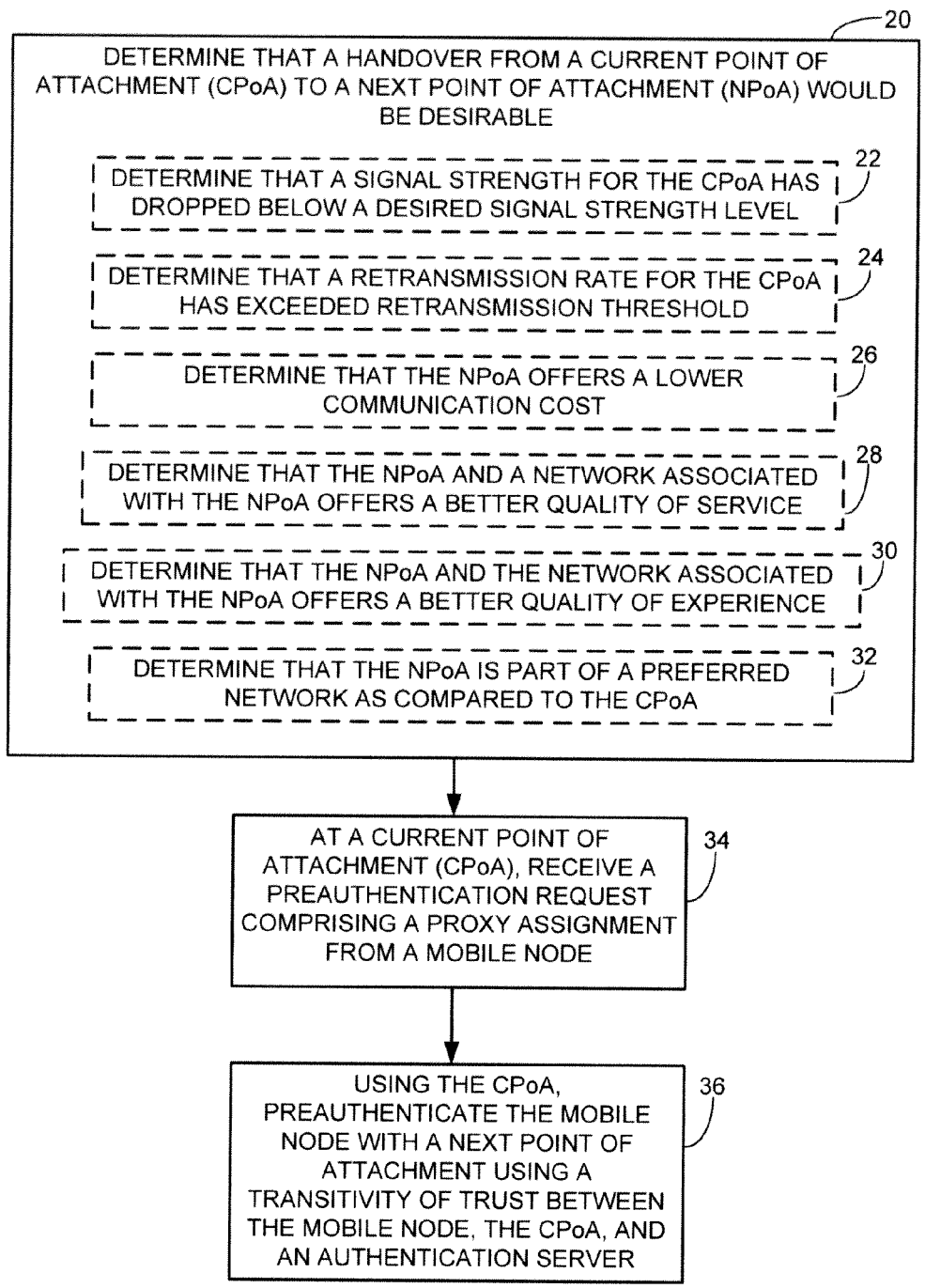
FIG. 1 is a flow chart of a method of preauthenticating a mobile node in advance of a switch from a current point of attachment (CPoA) to a next point of attachment (NPoA), according to some embodiments.

It will be appreciated that for purposes of clarity and where deemed appropriate, reference numerals have been repeated in the figures to indicate corresponding features. While the method and system for preauthenticating a mobile node are described herein by way of example for several embodiments and illustrative drawings, those skilled in the art will recognize that the system and method are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

FIG. 1 is a flow chart of a method of preauthenticating a mobile node in advance of a switch from a current point of attachment (CPoA) to a next point of attachment (NPoA), according to some embodiments. In optional step 20, a determination may be made that a handover from a current point of attachment (CPoA) to a next point of attachment (NPoA) would be desirable. This determination could be made for various reasons, as illustrated by the non-limiting examples of optional steps 22-32. In optional step 22, a determination may be made that a signal strength for the CPoA has dropped below a desired signal strength level. Signal strength for the connection with the CPoA is readily measured by the mobile node, and is well-known to those skilled in the art. In optional step 24, a determination may be made that a retransmission rate for the CPoA has exceeded a retransmission threshold. The mobile node and the CPoA often will communicate using a protocol that divides communicated data into packets for transmission therebetween. Data packets may become lost or corrupted for a variety of reasons, and if this occurs, the data packets, are often retransmitted. High retransmission rates impact regular communications by reducing quality of service and potentially introducing unacceptable communication delays. Accordingly, the mobile node and/or the CPoA may monitor retransmission rates to see if the retransmission threshold has been reached or exceeded.

In optional step 26, a determination may be made that the NPoA offers a lower communication cost. A mobile node connected to a CPoA will be able to evaluate various parameters for the NPoA. Among those parameters may be a cost of communication for the NPoA. Such cost may come from a look-up table on the mobile node, may come from the NPoA (for example in the form of a regular beacon or broadcast message), or may come from a back end server configured to help coordinate service for the mobile node. Similarly, in optional steps, 28, 30, and 32, a determination may be made that the NPoA offers a better quality of service, a better quality of experience, and/or that the NPoA is part of a preferred network as compared to the CPoA. Again, statistics regarding quality of service, quality of experience, or a preference indication for the NPoA may come from a look-up table on the mobile node, may come from the NPoA (for example in the form of a regular beacon or broadcast message), or may come from a back end server configured to help coordinate service for the mobile node.

In step 34, at the CPoA, a preauthentication request, comprising a proxy assignment from a mobile node, is received. The preauthentication request can be packaged using an authentication protocol such as, but not limited to extensible authentication protocol (EAP), extensible authentication protocol-transport level security (EAP-TLS), or any other authentication protocol that does not prevent the mobile node from generating a verifiable proxy assignment. In step 36, using the CPoA, the mobile node is preauthenticated with the NPoA using a transitivity of trust between the mobile node, the CPoA, and an authentication server. This allows the mobile node to use the CPoA as a proxy for carrying out preauthentication with the NPoA and delegate the preauthentication related processing and signaling to the proxy. This reduces the number of signaling messages needed between the mobile node and the CPoA. It also reduces the computational requirements on the mobile node since the CPoA is handling the bulk of the preauthentication related processing on behalf of the mobile node.

Figure 2:
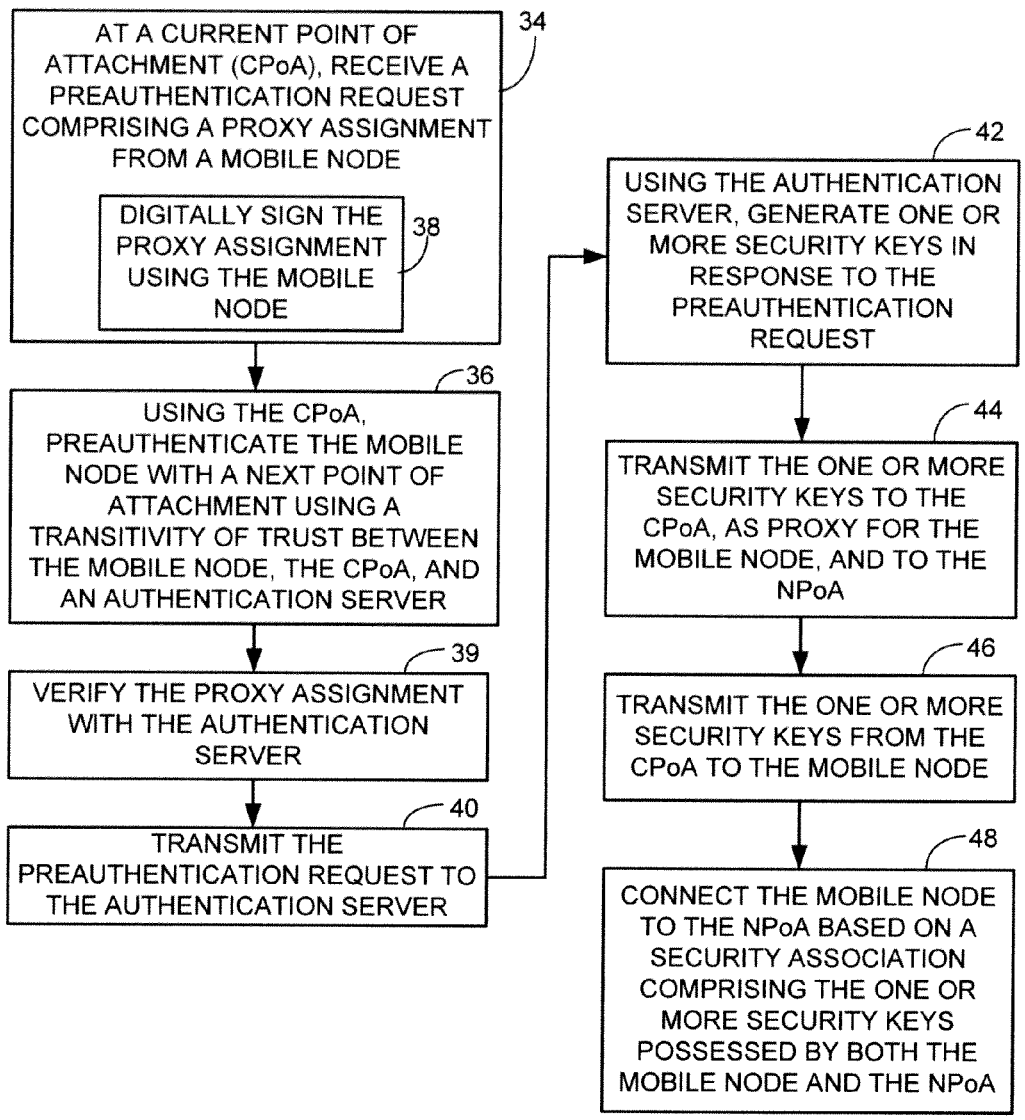
FIG. 2 is another flow chart of a method of preauthenticating a mobile node in advance of a switch from a CPoA to an NPoA according to some embodiments.

FIG. 2 is another flow chart of a method of preauthenticating a mobile node in advance of a switch from a CPoA to an NPoA according to some embodiments. As in the previous method, in step 34, at the CPoA, a preauthentication request, comprising a proxy assignment from a mobile node, is received. In substep 38, the proxy assignment may be digitally signed by the mobile node. As in the previous method, in step 36, using the CPoA, the mobile node is preauthenticated with the NPoA using a transitivity of trust between the mobile node, the CPoA, and an authentication server. In step 39, the proxy assignment may be verified with the authentication server. It should be noted that the authentication server is the one which is associated with the NPoA. In step 40 the preauthentication request is transmitted by the CPoA to the authentication server. In step 42, using the authentication server, one or more security keys are generated in response to the preauthentication request. In step 44 the one or more security keys are transmitted to the CPoA (as proxy for the mobile node) and to the NPoA. In step 46, the one or more security keys are transmitted from the CPoA to the mobile node. Up until this point, the CPoA has been handling the necessary preauthentication actions and computations on behalf of the mobile node in order to reduce the number of transmissions needed in the system and to reduce the computation requirements on the mobile node. In step 48, the mobile node connects to the NPoA based on a security association comprising the one or more security keys possessed by both the mobile node and the NPoA. Depending on the embodiment, the mobile node may communicate with the CPoA and the NPoA using the same or different communication protocols.

Figures 3A, 3B:
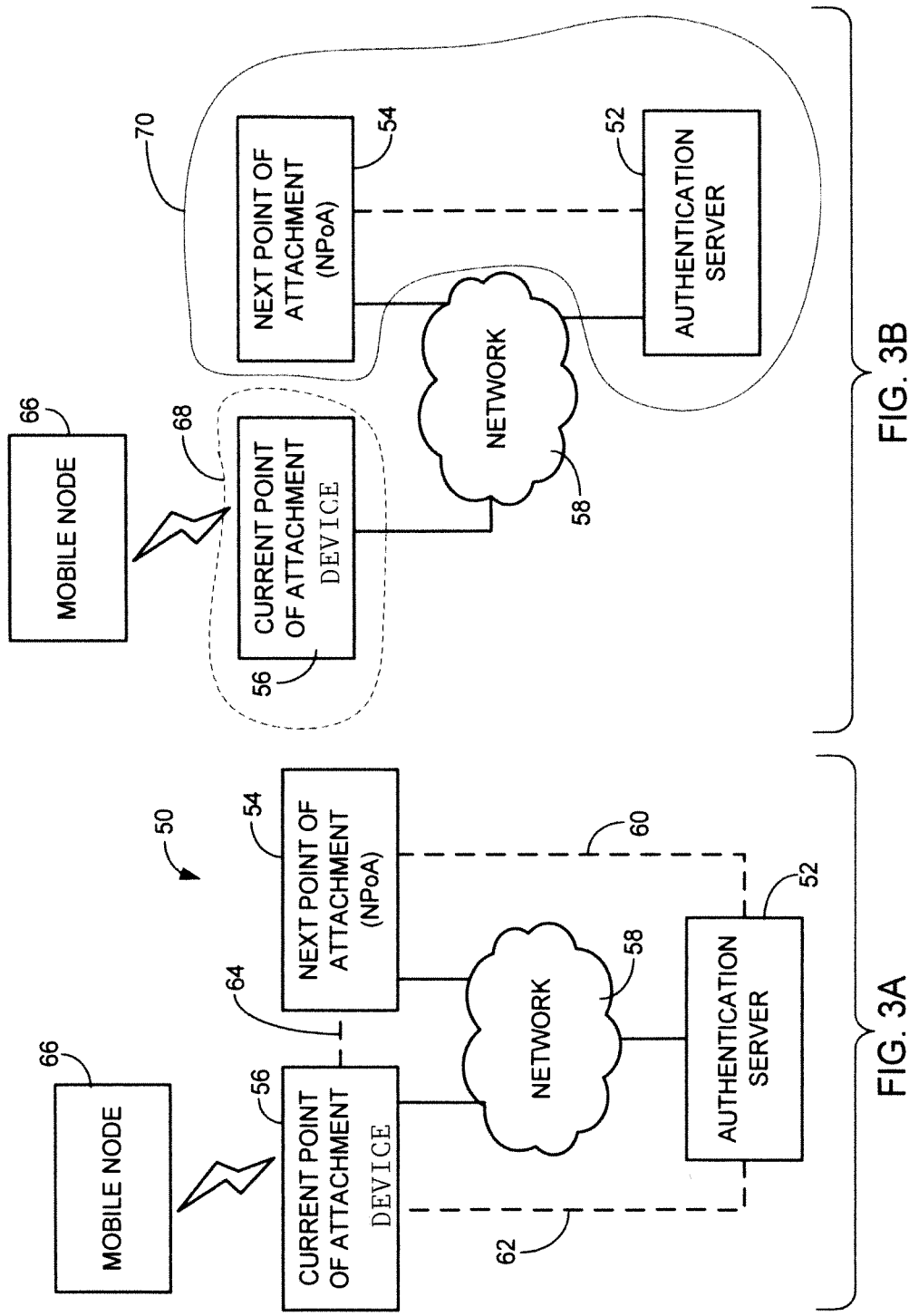
FIG. 3A schematically illustrate a communication system according to some embodiments.
FIG. 3B schematically illustrates a communication system according to other embodiments.

FIGS. 3A and 3B schematically illustrate embodiments of communication systems for preauthenticating a mobile node in advance of a switch from a CPoA to an NPoA. In FIG. 3A, the communication system 50 has an authentication server 52, a next point of attachment (NPoA) 54, and a current point of attachment (CPoA) 56. The authentication server 52 is associated at least with the NPoA 54, and may also optionally be associated with the CPoA 56. An authentication server verifies the identity and permission of a mobile node to be able to access a particular network resource, such as a point of attachment, and can also issue security keys to the mobile node and the point of attachment in order to guarantee secure communications between authenticated resources. The CPoA 56 and the NPoA 54 may be, but are not limited to, wireless access points, wireless routers, gateway devices, or computing devices. The authentication server 52 may be coupled to the NPoA 54 via a network 58 or via an optional direct connection 60. Similarly, the authentication server 52 may be coupled to the CPoA 56 via the network 58 or via an optional direct connection 62. The CPoA 56 may be coupled to the NPoA 54 via the network 58 or via an optional direct connection 64. Communication connections between the CPoA 56, NPoA 54, and/or the authentication server 52 of the communication system 50 may include, but are not limited to wired cable connections, radio frequency (RF) connections, and fiber-optic connections.

The CPoA 56 is configured to receive a preauthentication request comprising a proxy assignment from a mobile node 66. Some non-limiting examples of a mobile node include a mobile phone, a personal digital assistant (PDA), a smartphone, a wireless computing device, or a mobile gateway, a mobile wireless router, and a mobile wireless access point. The CPoA 56 is further configured to forward the preauthentication request and the proxy assignment to the authentication server 52 via the NPoA 54 to preauthenticate the mobile node 66 (for impending communication with the NPoA 54) using a transitivity of trust between the mobile node 66, the CPoA 56, and the authentication server 52. The authentication server 52 may be configured to verify the proxy assignment, and then generate one or more security keys in response to the preauthentication request. The authentication server 52 may also be configured to transmit the one or more security keys to the CPoA 56, as a proxy for the mobile node 66, and to the NPoA 54. The CPoA 56 passes the one or more security keys to the mobile node 66. The mobile node 66 may be configured to connect to the NPoA 54 based on a security association comprising the one or more security keys possessed by both the mobile node 66 and the NPoA 54.

The mobile node 66 may communicate with the CPoA 56 and the NPoA 54 using a first communication protocol and a second communication protocol, respectively. In some embodiments, as illustrated in FIG. 3B, the authentication server 52 will only be associated with the NPoA 54, and not with the CPoA 56. In this case, the communication system would include a first network administrative domain 68 and a second network administrative domain 70. The first network administrative domain 68 comprises the CPoA 56 and its own authentication server (not shown) used to establish the original connection between the mobile node 66 and the CPoA 56. The second network administrative domain 70 comprises the NPoA 54 and the authentication server 52.

Figure 4:
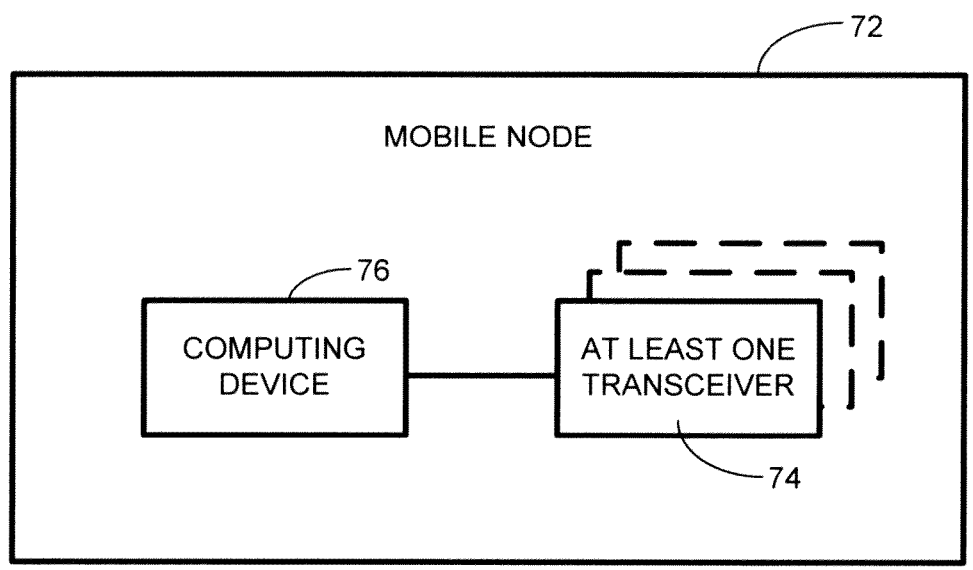
FIG. 4 schematically illustrates a mobile node according to some embodiments.

FIG. 4 schematically illustrates an embodiment of a mobile node 72 configured for use with the methods and systems described above. The mobile node 72 has at least one transceiver 74. The disclosed preauthentication methods will work for handovers between a current point of attachment (CPoA) and a next point of attachment (NPoA), whether or not the CPoA and the NPoA utilize the same communication protocol. In some embodiments, the mobile node 72 may include a first transceiver configured to communicated with the CPoA, and a second transceiver configured to communicate with the NPoA.

The mobile node 72 also has a computing device 76 coupled to the at least one transceiver 74 and configured to determine that a handover from a CPoA to a NPoA would be desirable. This determination may be made based on:

a signal strength for the CPoA dropping below a desired signal strength level;

a retransmission rate for the CPoA exceeding a retransmission threshold;

the NPoA offering a lower communication cost;

the NPoA and a network associated with the NPoA offering a better quality of service;

the NPoA and a network associated with the NPoA offering a better quality of experience; and/or the NPoA is part of a preferred network as compared to the CPoA.

The computing device 76 for the mobile node 72 is also configured to transmit a preauthentication request for the NPoA to the CPoA. The preauthentication request includes a proxy assignment so that the previously described methods may be implemented to reduce the number of transmissions between the mobile node 72 and the CPoA (since the CPoA can act as proxy for the mobile node) and to reduce the computational load on the mobile node 72 (since the CPoA can carry out many of the necessary cryptographic computations needed with the security keys during preauthentication). The computing device 76 may be, but is not limited to a microprocessor, an application specific integrated circuit (ASIC), a field programmable gate array (FPGA), digital circuitry, analog circuitry, or any combination and/or plurality thereof.

The mobile node 72 may be further configured to receive one or more security keys from the CPoA in response to the preauthentication request. The one or more security keys can be used by the computing device 76 and the at least one transceiver to establish a connection with the NPoA.

Figure 5:
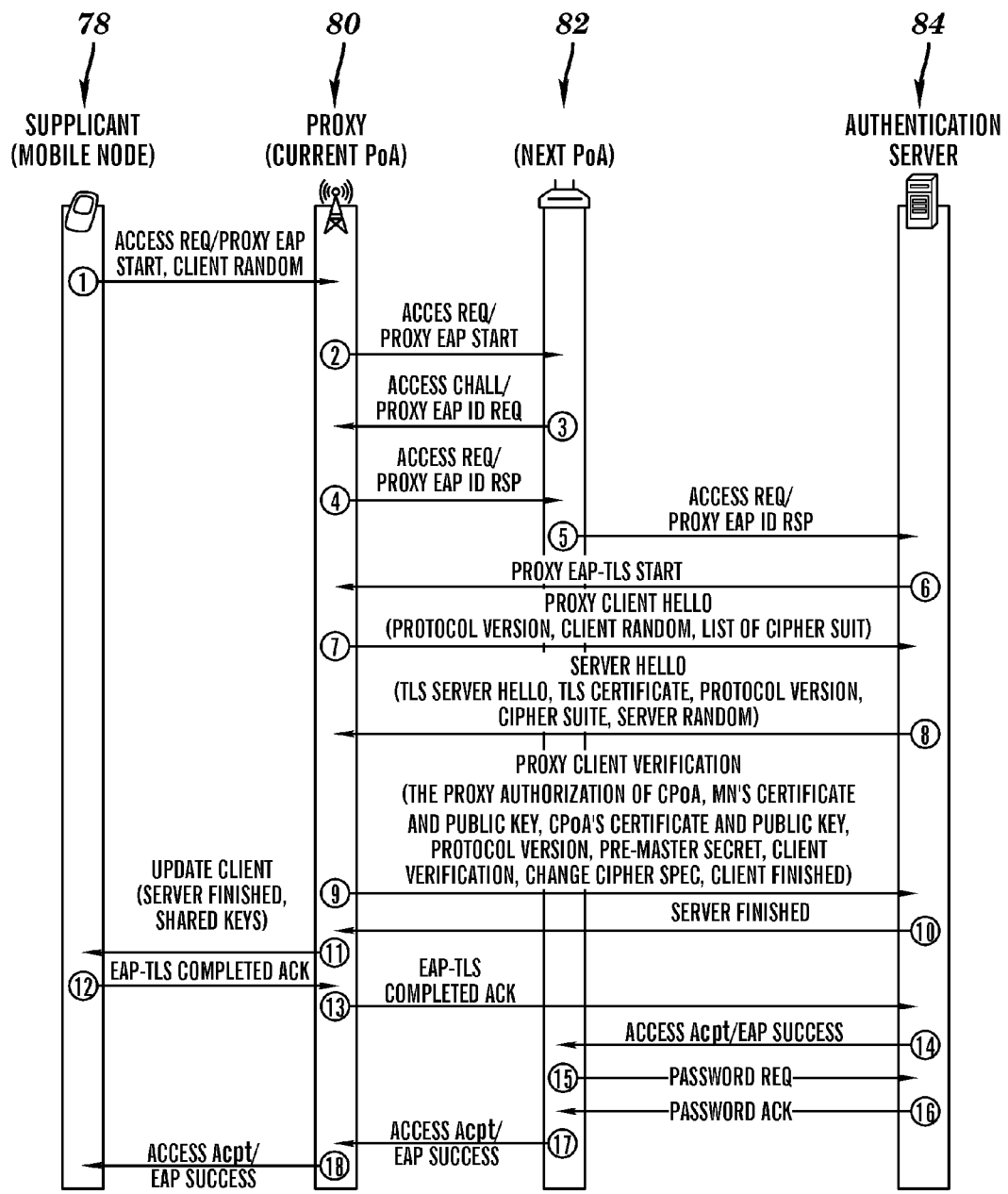
FIG. 5 is a further flow chart of a method of preauthenticating a mobile node in advance of a switch from a CPoA to an NPoA according to other embodiments.

FIG. 5 is a further flow chart of a method of preauthenticating a mobile node in advance of a switch from a current point of attachment (CPoA) to a next point of attachment (NPoA) according to other embodiments. There are four parties involved in the embodied method: 1) the mobile node 78 acting as a supplicant; 2) the CPoA 80 acting as a proxy; 3) the NPoA 82; and 4) the authentication server 84 associated with the NPoA 82. FIG. 5 illustrates a message flow among the four parties for preauthenticating the mobile node as follows:

Message 1: Preauthentication request/Proxy EAP Start: This is sent by the mobile node 78 to the CPoA 80 and may include one or more of the following information: The mobile node's 78 identification, the desired NPoA's 82 identification, a communication protocol identifier, a highest protocol version supported, a list of available cipher suites, the mobile node's 78 public key, a certificate list, a client random number which may be a combination of a time stamp and a number used once ("nonce") generated by the mobile node 78, and a signed authorization by the mobile node 78 for the CPoA 80 to act as the mobile node's 78 authentication agent. In this embodiment, this message is different from a direct EAP start and combines the EAP start and Client Hello Messages.

Message 2: This is a Proxy Access Request/Proxy EAP Start sent by the CPoA 80 to the NPoA 82, and includes the EAP start message only.

Message 3: This is a Proxy Access Challenge/EAP ID Request sent by the NPoA 82 to the CPoA 80, including a request to send the identification of the node requesting access.

Message 4: This is a Proxy Access Request/EAP ID Response sent by the CPoA 80 to the authentication server 84 through the NPoA 82, including the mobile node's 78 identification and the CPoA's 80 identification.

Message 5: This is a Proxy Access Request/EAP ID Response sent by the NPoA 82 to the authentication server 84 indicating to the authentication server 84 that a mobile node 78 is requesting authentication through a proxy 80.

The next five messages are essentially between the authentication server 84 and the CPoA 80, with the NPoA 82 acting as a pass through node.

Message 6: This is a TLS start Message sent by the authentication server 84 to the CPoA 80 indicating the start of a TLS-based authentication sequence.

Message 7: Proxy Client Hello sent by the CPoA to the authentication server 84. It includes the following information: the highest protocol version number supported between the mobile node 78 and the CPoA 80; the client random number (as generated and provided by the mobile node 78); a list of available cipher suites (an intersection of the sets available at the CPoA 80 and the set sent by the mobile node 78).

Message 8: Server Hello sent by the authentication server 84 to the CPoA 80, including the highest protocol version number; an authentication server 84 random number (a concatenation of time stamp and a random number generated by the authentication server 84); a cipher suite which is the strongest among the list provided in the client hello message that is supported by the authentication server 84 (if no such cipher exists, then it generates a handshake failure alert); and an authentication server 84 certificate list. Message 8 in this embodiment does not include a client certificate request since client certificates are included in the "client hello" message.

Message 9: Client Response and Verification sent by the CPoA 80 to the authentication server 84, including the proxy authorization of the CPoA 80 by the mobile node 78; the mobile node's 78 certificate and public key; the CPoA's 80 certificate and public key; client confirmation of protocol version; a pre master secret number (a CPoA 80 generated random number encrypted with the authentication server 84 public key. This is used along with the client random number and server random number to generate the master secret number); a client verification message (This is a hash of all the messages exchanged up to this point signed by the private key of the CPoA 80 in order to prevent a "man-in-the-middle" attack); a change cipher spec message (to indicate that henceforth, all exchanges will use the keys and algorithms just negotiated); and a client finished message using the newly generated cipher keys as digitally signed by the CPoA 80.

On receipt of the Message 9, the authentication server 84 verifies the mobile node's 78 certificate against its identification. The authentication server 84 also verifies the CPoA's 80 certificate against its identification; verifies the authenticity and freshness of the mobile node's 78 proxy authorization of the CPoA 80; and for all subsequent signature verification processes during the EAP method, it remembers to accept the CPoA's 80 signature as a valid substitute of the mobile node's 78 signature. The authentication sever 84 also verifies the validity of the client finished message.

Message 10: Server Finished Message sent by the authentication server 84 to the CPoA 80, including confirmation of the change of cipher specifications, and a TLS Finished Message. These may be encrypted using the newly negotiated keys.

Message 11: Update Client Message sent by the CPoA 80 to the mobile node 78, including a Server Finished Indication Message, the client random number, the server random number, and the pre-master secret number encrypted using the mobile node's 78 public key. Message 11 informs the mobile node 78 that the proxy based preauthentication has been successfully carried out so far, and the CPoA 80 is the originator of this message. The mobile node 78 also now has all the keys necessary to form a security association with the NPoA 82.

Messages 12 and 13: EAP-TLS Completed Acknowledge sent by the mobile node 78 to the authentication server 84 through the CPoA 80 and the NPoA 82. This informs the authentication server 84 that the mobile node 78 now has all the necessary keys.

Message 14: EAP-Success sent by the authentication server 84 to the NPoA 82, indicating successful completion of the Proxy-based EAP-TLS method.

Message 15: Password Request sent by the NPoA 82 to the authentication server 84, including a request to receive the keys generated during the EAP-authentication process.

Message 16: Password Acknowledge sent by the authentication server 84 to the NPoA 82, including the keys generated during the EAP-authentication process, and delivered through a secured channel between the authentication server 84 and the NPoA 82.

Messages 17 and 18: EAP Success. This is message 16 relayed by the NPoA 82 to the mobile node 78 through the CPoA 80. Its receipt by the mobile node 78 completes the proxy-based preauthentication sequence for this embodiment.

Figure 6:
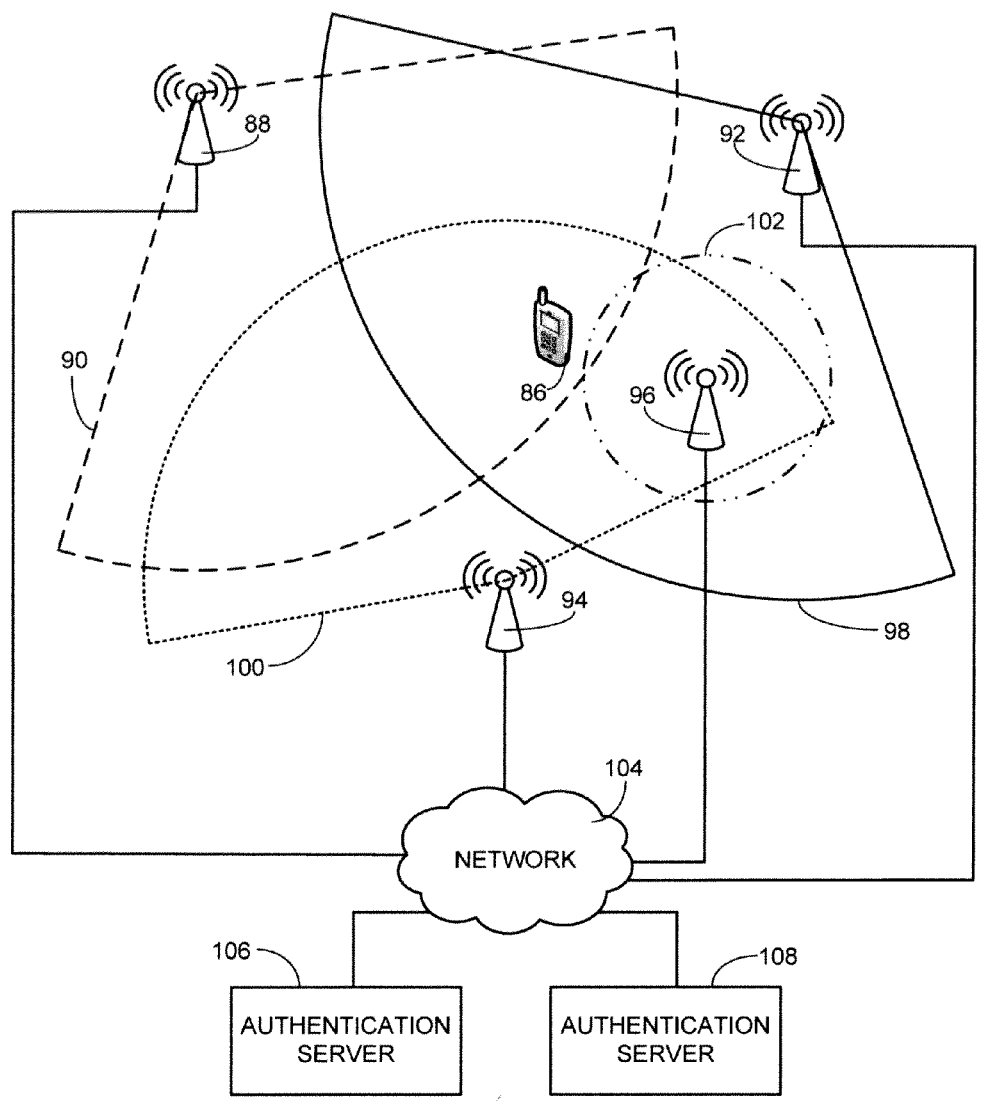
FIG. 6 schematically illustrates a communication system according to further embodiments.

Although the previous embodiments have been described with a focus on the handover between a current point of attachment (CPoA) and a next point of attachment (NPoA), some embodiments will have more than one choice for what the NPoA could be. For example, consider the communication system schematically illustrated in FIG. 6 according to further embodiments. A mobile node 86 is attached to a CPoA 88 which has a wireless coverage area 90. Nearby, there are a plurality of possible points of attachment (PPoAs) 92, 94, 96 which have corresponding coverage areas 98, 100, 102. PPoAs 92 and 94 are coupled via network 104 to authentication server 106, while PPoA 96 is coupled via network 104 to authentication server 108. Those skilled in the art will readily appreciate that there are numerous other ways to couple PPoAs to one or more authentication servers, and that in various scenarios, the PPoAs could have different numbers and/or coverage areas, and the PPoAs may or may not use the same communication protocol and/or be part of the same network administrative domain. In this example, in addition to the coverage area 90 for its CPoA 88, mobile node 86 is within coverage areas 98 and 100 for the PPoAs 92 and 94. While mobile node 86 is not within coverage area 102 for PPoA 96, the mobile node 86 may nevertheless consider PPoA 96 along with PPoAs 92 and 94 as a possible point of attachment. Therefore, in this example, mobile node 86 has a choice of one or more possible points of attachment (PPoAs) to use as a next point of attachment (NPoA). While in some embodiments, such as those previously discussed, the mobile node 86 may make a decision as to which of the PPoAs will be the NPoA before starting the preauthentication process, in other embodiments, the mobile node 86 may be configured to hold off on choosing the NPoA. Alternatively, the mobile node 86 may not be ready to choose the NPoA. In situations like these, some embodiments may have the mobile node 86 preauthenticate with one or more potential points of attachment (PPoAs) before choosing which of the PPoAs will be the NPoA. Such embodiments would enable the mobile node to delay the selection of the NPoA until just before the handover occurs, and also decouple the preauthentication from the selection of the NPoA to provide more flexibility. The one or more potential points of attachment (PPoAs) may be identified by the mobile node 86 on its own or with assistance from the CPoA 88 which may be configured to keep track of neighboring access networks. For example, the mobile node 86 in the example of FIG. 6 is aware of PPoAs 92 and 94 because it is within their coverage areas 98, 100, but the mobile node 86 may not be aware of PPoA 96 on its own. However, the CPoA 88 (or a module associated with CPoA 88) may be aware of PPoA 96 as a neighboring access point and can so inform the mobile node 86. The CPoA 88 can even suggest possible PPoAs based on the mobility pattern (for example, speed) of the mobile node 86. The mobile node 86 may use information from the CPoA 88 and/or information gathered from currently visible access points to develop a list of possible candidate access points for preauthentication. Although not necessary, this can happen before the mobile node 86 has entered the coverage area of the possible points of attachment.

Figure 7A:
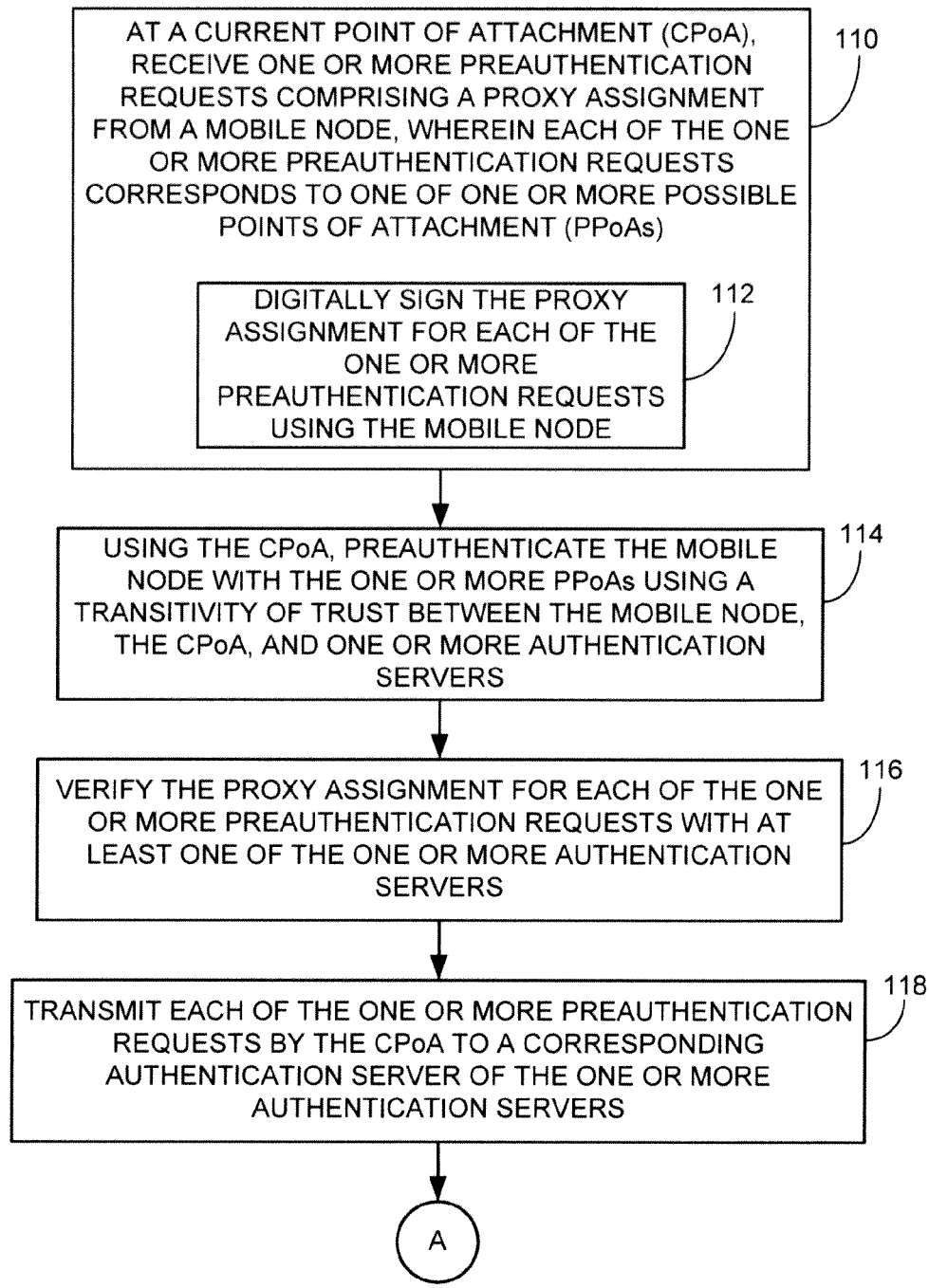
FIGS. 7A-7B are flow charts of a method of preauthenticating a mobile node in advance of a switch from a CPoA to an NPoA according to further embodiments.
Figure 7B:
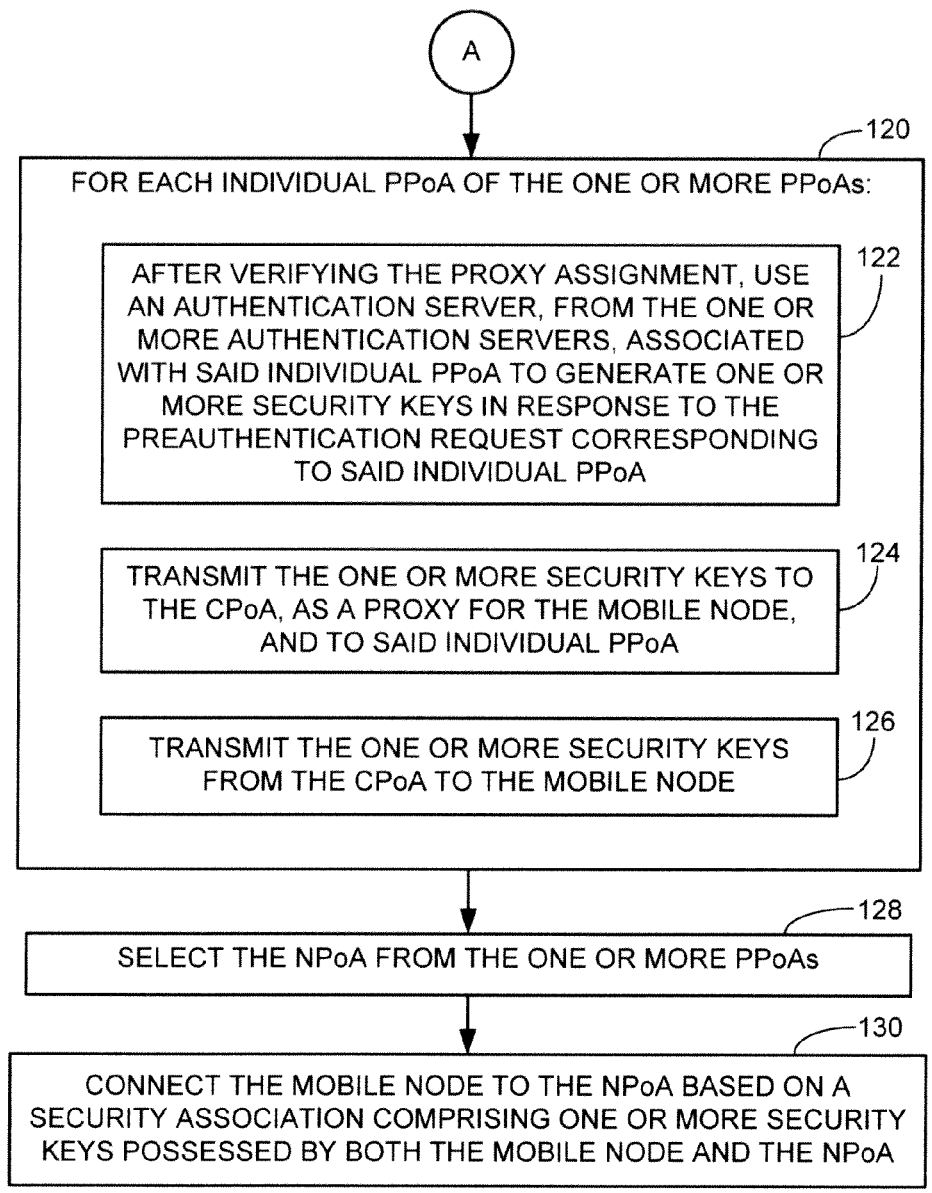

FIGS. 7A-7B are flow charts of a method of preauthenticating a mobile node in advance of a switch from a CPoA to an NPoA according to further embodiments. The method illustrated in FIGS. 7A and 7B is similar to the methods discussed above, however, the method in FIGS. 7A and 7B provides flexibility to decouple preauthentication from a selection of a next point of attachment (NPoA). While it is possible first to make a determination that a handover from a CPoA to an NPoA would be desirable, this determination does not need to be made up front. Instead, as discussed above, there may be several possible points of attachment (PPoAs) which could be candidates for a next point of attachment. In step 110, one or more preauthentication requests may be received at a CPoA. The one or more preauthentication requests include a proxy assignment from a mobile node, and each of the one or more preauthentication requests corresponds to one of one or more PPoAs. As part of substep 112, the mobile node may digitally sign the proxy assignment for each of the one or more preauthentication requests. The preauthentication request can be packaged using an authentication protocol such as, but not limited to extensible authentication protocol (EAP), extensible authentication protocol-transport level security (EAP-TLS), or any other authentication protocol that does not prevent the mobile node from generating a verifiable proxy assignment. In step 114, using the CPoA, the mobile node is preauthenticated with the one or more PPoAs using a transitivity of trust between the mobile node, the CPoA, and one or more authentication servers. Each of the one or more PPoAs may have a separate authentication server, may share a common authentication server, or there may be a mixture of one-to-one PPoA/authentication server mapping and shared PPoA/authentication server mapping. This allows the mobile node to use the CPoA as a proxy for carrying out preauthentication with each of the PPoAs and delegate the preauthentication related processing and signaling to the proxy. This reduces the number of signaling messages needed between the mobile node and the CPoA. It also reduces the computational requirements on the mobile node since the CPoA is handling the bulk of the preauthentication related processing on behalf of the mobile node. In step 116, the proxy assignment for each of the one or more preauthentication requests is verified with at least one of the one or more authentication servers. Each of the one or more preauthentication requests will be for a particular PPoA. Each particular PPoA will be coupled to and/or rely on a corresponding authentication server. In step 118, each of the one or more preauthentication requests are transmitted by the CPoA to the corresponding authentication server of the one or more authentication servers. The method continues in FIG. 7B with step 120. In step 120, several substeps occur for each individual PPoA of the one or more PPoAs. In substep 122, using an authentication server from the one or more authentication servers associated with said individual PPoA, one or more security keys are generated in response to the preauthentication request corresponding to said individual PPoA. In substep 124, the one or more security keys are transmitted to the CPoA (as proxy for the mobile node) and to said individual PPoA. In substep 126, the one or more security keys are transmitted from the CPoA to the mobile node. Substeps 122, 124, 126 may be repeated for each individual PPoA for which the mobile node seeks preauthentication. Up until this point, the CPoA has been handling the necessary preauthentication actions and computations on behalf of the mobile node in order to reduce the number of transmissions needed in the system and to reduce the computation requirements on the mobile node.

The mobile node is now preauthenticated with one or more possible points of attachment (PPoAs), but has not had to select which of the PPoAs will be the NPoA. In step 128, the NPoA is selected from the one or more PPoAs. The selection of the NPoA from the one or more PPoAs may be based on one or more of a variety of considerations, such as, but not limited to:

choosing a PPoA having a highest signal strength among the one or more PPoAs to be the NPoA;

choosing a PPoA having a lowest retransmission rate among the one or more PPoAs to be the NPoA;

choosing a PPoA having a lowest communication cost among the one or more PPoAs to be the NPoA;

choosing a PPoA having a best quality of service among the one or more PPoAs to be the NPoA;

choosing a PPoA having a best quality of experience among the one or more PPoAs to be the NPoA; and/or choosing a PPoA having a preferred network among the one or more PPoAs to be the NPoA.

The selection of the NPoA in step 128 may be decoupled from the preceding preauthorization steps for flexibility as previously described. In step 130, the mobile node connects to the NPoA based on a security association comprising the one or more security keys possessed by both the mobile node and the NPoA. Depending on the embodiment, the mobile node may communicate with the CPoA and the NPoA using the same or different communication protocols.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for preauthenticating a mobile node in advance of a switch from a current point of attachment (CPoA) to a next point of attachment (NPoA), comprising:
   receiving by a CPoA device, one or more preauthentication requests comprising a proxy assignment from a mobile node, wherein each of the one or more preauthentication requests corresponds to one of one or more possible points of attachment (PPoAs);
   receiving, by the CPoA device, one or more security keys generated by one of one or more authentication servers in response to the one or more preauthentication requests corresponding to the one or more PPoAs after verification of the proxy assignment by one of the one or more authentication servers associated with the one or more PPoAs;
   transmitting, by the CPoA device, the one or more security keys to the one or more PPoAs and the mobile node;
   determining, by the CPoA device, to switch from the CPoA to the NPoA that offers a lowest communication cost based on communications cost information from the mobile node, the NPoA, or a back-end server, when a retransmission rate for the CPoA exceeds a retransmission threshold;
   transmitting, by the CPoA device, the one or more preauthentication requests to one or more authentication servers; and
   preauthenticating, by the CPoA device, the mobile node with the one or more PPoAs using a transitivity of trust between the mobile node, the CPoA, and the one or more authentication servers by verifying the proxy assignment for each of the one or more preauthentication requests with at least one of the one or more authentication servers.

2. The method of claim 1, further comprising:
   digitally signing, by the CPoA device, the proxy assignment for each of the one or more preauthentication requests by the mobile node.

3. The method of claim 1, wherein each of the one or more preauthentication requests comprises an authentication protocol comprising:
   an extensible authentication protocol (EAP),
   an extensible authentication protocol-transport level security (EAP-TLS), or
   an authentication protocol that does not prevent the mobile node from generating a verifiable proxy assignment.

4. The method of claim 1, wherein the one or more PPoAs comprises a single PPoA that is the NPoA, the method further comprising:
   connecting, by the CPoA device, the mobile node to the NPoA based on a security association comprising the one or more security keys possessed by both the mobile node and the NPoA.

5. The method of claim 4, further comprising:
   determining, by the CPoA device, when to perform a handover from the CPoA to the NPoA based on network signal information from the mobile node.

6. The method of claim 5, wherein the determining when to perform the handover from the CPoA to the NPoA occurs prior to the preauthentication.

7. The method of claim 5, wherein the network signal information from the mobile node to the NPoA further comprises:
a signal strength for the CPoA, a quality of service, a quality of experience, or a preferred network status.

8. The method of claim 1, further comprising:
selecting, by the CPoA device, the NPoA from the one or more PPoAs; and
connecting, by the CPoA device, the mobile node to the NPoA based on a security association comprising one or more security keys possessed by both the mobile node and the NPoA.

9. The method of claim 8, wherein the selection of the NPoA from the one or more PPoAs occurs after the mobile node is preauthenticated with the one or more PPoAs.

10. The method of claim 8, wherein:
the CPoA device belongs to a first network administrative domain; and
the NPoA belongs to a second network administrative domain.

11. The method of claim 8, wherein selecting the NPoA from the one or more PPoAs comprises:
selecting a PPoA with a highest signal strength among the one or more PPoAs to be the NPoA;
selecting a PPoA with a lowest retransmission rate among the one or more PPoAs to be the NPoA;
selecting a PPoA with the lowest communication cost among the one or more PPoAs to be the NPoA;
selecting a PPoA with a best quality of service among the one or more PPoAs to be the NPoA;
selecting a PPoA with a best quality of experience among the one or more PPoAs to be the NPoA; or
selecting a PPoA with a preferred network among the one or more PPoAs to be the NPoA.

12. The method of claim 8, further comprising:
determining when to perform a handover from the CPoA to the NPoA based on network signal information.

13. The method of claim 12, wherein the determination of when to perform the handover from the CPoA to the NPoA occurs after the preauthentication.

14. The method of claim 12, wherein the network signal information further comprises:
a signal strength for the CPoA, a retransmission rate for the CPoA, a quality of service, a quality of experience, or a preferred network status.

15. The method of claim 1, further comprising:
determining, when the NPoA belongs to a preferred network based on preferred network data from a preferred network look-up table, wherein the determining to switch from the CPoA to the NPoA is further based on the preferred network data.

16. A non-transitory computer readable medium having stored thereon instructions for preauthenticating a mobile node in advance of a switch from a current point of attachment (CPoA) to a next point of attachment (NPoA) comprising machine executable code which when executed by at least one processor, causes the processor to perform steps comprising:
receiving one or more preauthentication requests comprising a proxy assignment from a mobile node, each of the one or more preauthentication requests corresponding to one of one or more possible points of attachment (PPoAs);
receiving one or more security keys generated by one of one or more authentication servers in response to the one or more preauthentication requests corresponding to the one or more PPoAs after verification of the proxy assignment by one of the one or more authentication servers associated with the one or more PPoAs;
transmitting the one or more security keys to the one or more PPoAs and the mobile node;
determining to switch from the CPoA to the NPoA that offers a lowest communication cost based on communications cost information from the mobile node, the NPoA, or a back-end server, when a retransmission rate for the CPoA exceeds a retransmission threshold;
transmitting the one or more preauthentication requests to one or more authentication servers; and
preauthenticating, the mobile node with the one or more PPoAs using a transitivity of trust between the mobile node, the CPoA, and the one or more authentication servers by verifying the proxy assignment for each of the one or more preauthentication requests with at least one of the one or more authentication servers.

17. The medium of claim 16 having further stored thereon instructions that when executed by the processor cause the processor to perform steps further comprising:
digitally signing the proxy assignment for each of the one or more preauthentication requests by the mobile node.

18. The medium of claim 16, wherein the one or more PPoAs comprises a single PPoA that is the NPoA, and having further stored thereon instructions that when executed by the processor cause the processor to perform steps further comprising:
connecting the mobile node to the NPoA based on a security association comprising the one or more security keys possessed by both the mobile node and the NPoA.

19. The medium of claim 18 having further stored thereon instructions that when executed by the processor cause the processor to perform steps further comprising:
determining when to perform a handover from the current point of attachment to the NPoA based on network signal information from the mobile node.

20. The medium of claim 19, wherein the determining when to perform the handover from the current point of attachment to the NPoA occurs prior to the preauthentication instructions.

21. The medium of claim 19, wherein the determining when to perform the handover from the CPoA to the NPoA is further based on network signal information from the mobile node further comprising:
a signal strength for the current point of attachment,
a quality of service of a network associated with the NPoA,
a quality of experience of a network associated with the NPoA, or
a preferred network status of the NPoA.

22. The medium of claim 16, having further stored thereon instructions that when executed by the processor cause the processor to perform steps further comprising:
selecting the NPoA from the one or more PPoAs; and
connecting the mobile node to the NPoA based on a security association comprising one or more security keys possessed by both the mobile node and the NPoA.

23. The medium of claim 22, wherein the CPoA device belongs to a first network administrative domain and the NPoA belongs to a second network administrative domain.

24. The medium of claim 22, wherein the selecting the NPoA from the one or more PPoAs occurs after the mobile node is preauthenticated with the one or more PPoAs.

25. The medium of claim 22, further having stored thereon instructions that when executed by the processor cause the processor to perform steps further comprising:

selecting a PPoA with a highest signal strength among the one or more PPoAs to be the NPoA;
selecting a PPoA with a lowest retransmission rate among the one or more PPoAs to be the NPoA;
selecting a PPoA with the lowest communication cost among the one or more PPoAs to be the NPoA;
selecting a PPoA with a best quality of service among the one or more PPoAs to be the NPoA;
selecting a PPoA with a best quality of experience among the one or more PPoAs to be the NPoA; or
selecting a PPoA with a preferred network among the one or more PPoAs to be the NPoA.

26. The medium of claim 22, further having stored thereon instructions that when executed by the processor cause the processor to perform steps further comprising:
determining when to perform a handover from the current point of attachment to the NPoA based on network signal information.

27. The medium of claim 26, wherein the determining when to perform the handover from the current point of attachment to the NPoA occurs after the preauthentication.

28. The medium of claim 26, wherein the network signal information comprises:
a signal strength for the current point of attachment,
a retransmission rate for the current point of attachment,
a quality of service,
a quality of experience, or
a preferred network status.

29. The medium of claim 16, wherein each of the one or more preauthentication requests comprises an authentication protocol comprising:
an extensible authentication protocol (EAP),
an extensible authentication protocol-transport level security (EAP-TLS), or
an authentication protocol that does not prevent the mobile node from generating a verifiable proxy assignment.

30. The medium of claim 16, further having stored thereon instructions that when executed by the processor cause the processor to perform steps further comprising:
determining when the NPoA belongs to a preferred network based on preferred network data from a preferred network look-up table, wherein the determining to switch from the CPoA to the NPoA is further based on the preferred network data.

31. A Current Point of Attachment (CPoA) device comprising:
one or more processors;
a memory coupled to the one or more processors which are configured to be capable of executing programmed instructions and stored in the memory to:
receive one or more preauthentication requests comprising a proxy assignment from a mobile node, wherein each of the one or more preauthentication requests corresponds to one of one or more possible points of attachment (PPoAs);
receive one or more security keys generated by one of one or more authentication servers in response to the one or more preauthentication requests corresponding to the one or more PPoAs after verification of the proxy assignment by one of the one or more authentication servers associated with the one or more PPoAs;
transmit the one or more security keys to the one or more PPoAs and the mobile node;
determine to switch from a CPoA to the NPoA that offers a lowest communication cost based on communications cost information from the mobile node, the NPoA, or a back-end server, when a retransmission rate for the CPoA exceeds a retransmission threshold;
transmit the one or more preauthentication requests to one or more authentication servers; and
preauthenticate the mobile node with the one or more PPoAs using a transitivity of trust between the mobile node, the CPoA, and the one or more authentication servers by verifying the proxy assignment for each of the one or more preauthentication requests with at least one of the one or more authentication servers.

32. The device as set forth in claim 31, wherein each of the one or more preauthentication requests comprises an authentication protocol comprising:
an extensible authentication protocol (EAP), an extensible authentication protocol-transport level security (EAP-TLS), or
an authentication protocol that does not prevent the mobile node from generating a verifiable proxy assignment.

33. The device as set forth in claim 31, wherein the one or more PPoAs comprises a single PPoA that is the NPoA and the one or more processors is further configured to be capable of executing programmed instructions comprising and stored in the memory to:
connect the mobile node to the NPoA based on a security association comprising the one or more security keys possessed by both the mobile node and the NPoA.

34. The device as set forth in claim 33 wherein the one or more processors is further configured to be capable of executing programmed instructions comprising and stored in the memory to:
determine when to perform a handover from the CPoA to the NPoA based on network signal information from a mobile node.

35. The device as set forth in claim 34 wherein the determining when to perform the handover from the CPoA to the NPoA occurs prior to the preauthentication.

36. The device as set forth in claim 34 wherein the network signal information from the mobile node further comprises:
a signal strength for the CPoA,
a quality of service,
a quality of experience, or
a preferred network status.

37. The device as set forth in claim 31, wherein the one or more processors is further configured to be capable of executing programmed instructions comprising and stored in the memory to:
select the NPoA from the one or more PPoAs; and
connect the mobile node to the NPoA based on a security association comprising one or more security keys possessed by both the mobile node and the NPoA.

38. The device as set forth in claim 37 wherein the selection of the NPoA from the one or more PPoAs occurs after the mobile node is preauthenticated with the one or more PPoAs.

39. The device as set forth in claim 37 wherein:
the CPoA device belongs to a first network administrative domain; and
the NPoA belongs to a second network administrative domain.

40. The device as set forth in claim 37 wherein selecting the NPoA from the one or more PPoAs comprises:

selecting a PPoA with a highest signal strength among the one or more PPoAs to be the NPoA;

selecting a PPoA with a lowest retransmission rate among the one or more PPoAs to be the NPoA;

selecting a PPoA with the lowest communication cost among the one or more PPoAs to be the NPoA;

selecting a PPoA with a best quality of service among the one or more PPoAs to be the NPoA;

selecting a PPoA with a best quality of experience among the one or more PPoAs to be the NPoA; or selecting a PPoA with a preferred network among the one or more PPoAs to be the NPoA.

41. The device as set forth in claim 37 wherein the one or more processors is further configured to be capable of executing programmed instructions comprising and stored in the memory to:

determine when to perform a handover from the CPoA to the NPoA based on network signal information.

42. The device as set forth in claim 41 wherein the determining when to perform the handover from the CPoA to the NPoA occurs after the preauthentication.

43. The device as set forth in claim 37 wherein the determining when to perform the handover from the CPoA to the NPoA is further based on network signal information further comprising:

a signal strength for the CPoA, a retransmission rate for the CPoA, a quality of service, a quality of experience, or a preferred network status.

44. The device as set forth in claim 31 wherein the one or more processors is further configured to be capable of executing programmed instructions comprising and stored in the memory to:

digitally sign the proxy assignment for each of the one or more preauthentication requests by the mobile node.

45. The device of claim 31, wherein the one or more processors is further configured to be capable of executing programmed instructions comprising and stored in the memory to:

determine when the NPoA belongs to a preferred network based on preferred network data from a preferred network look-up table, wherein the determining to switch from the CPoA to the NPoA is further based on the preferred network data.

* * * * *